United States Patent
Sawyer et al.

(10) Patent No.: US 6,817,461 B1
(45) Date of Patent: Nov. 16, 2004

(54) CLUTCH MECHANISM WITH OVERTRAVEL CAPABILITY

(75) Inventors: Kass W. Sawyer, Neenah, WI (US); Donald F. Harry, Appleton, WI (US); John A. Tuchscherer, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/395,486

(22) Filed: Mar. 24, 2003

(51) Int. Cl.[7] .............................................. F16D 23/12
(52) U.S. Cl. ..................................... 192/93 R; 440/75
(58) Field of Search .......................... 192/21, 51, 93 R; 440/75; 74/55, 56, 57, 107, 567, 569

(56) References Cited

U.S. PATENT DOCUMENTS

| | | | | |
|---|---|---|---|---|
| 3,455,420 A | * | 7/1969 | Blanchard, Jr. .............. | 192/51 |
| 4,043,226 A | * | 8/1977 | Buuck ........................ | 475/158 |
| 4,223,773 A | | 9/1980 | Croisant et al. ......... | 192/48.91 |
| 4,579,204 A | * | 4/1986 | Iio ............................... | 192/21 |
| 4,637,802 A | * | 1/1987 | Taguchi et al. ............... | 440/75 |
| 4,789,366 A | * | 12/1988 | Hale et al. ..................... | 440/75 |
| 4,986,774 A | | 1/1991 | Wantz .......................... | 440/75 |
| 5,059,144 A | * | 10/1991 | Onoue .......................... | 440/75 |
| 6,123,591 A | * | 9/2000 | Onoue .......................... | 440/75 |
| 6,401,560 B1 | * | 6/2002 | Sato ............................. | 192/51 |
| 6,544,083 B1 | * | 4/2003 | Sawyer et al. ................ | 440/75 |
| 2003/0047020 A1 | * | 3/2003 | Ikeya ......................... | 74/473.1 |

* cited by examiner

*Primary Examiner*—Richard M. Lorence
(74) *Attorney, Agent, or Firm*—William D. Lanyi (57) ABSTRACT

A clutch mechanism for a marine propulsion system has a cam member that is rotatable about a first axis in coordination with the rotation of a shift shaft. A cam follower is associated with the cam member and supported for axial movement along a second axis. The cam follower is provided with cam follower surface segments that cause the cam follower to move axially in a direction parallel to the second axis in response to rotation of the cam member about the first axis between first and second rotational positions. Further rotation of the cam member from the second rotational position to a third rotational position causes no further movement of the cam follower because of the shape and position of cam follower surface segments that allow continual contact between the cam member and the cam follower while allowing rotation of the cam member without associated axial movement of the cam follower.

14 Claims, 6 Drawing Sheets

CLUTCH MECHANISM WITH OVERTRAVEL CAPABILITY

BACKGROUND OF THE INVENTION

1. Field of the Invention

The present invention is generally related to a clutch mechanism for a marine propulsion system and, more particularly, to a clutch mechanism that allows a shift mechanism to move beyond the degree of rotation required to move a clutch member into torque transmitting relation between a driveshaft and a driven shaft, such as a propeller shaft.

2. Description of the Prior Art

Those skilled in the art of marine transmissions are aware of many types of clutch actuators that can be used to move a clutch member into engagement with either a forward or reverse gear and also move the clutch member into a neutral position. Gear selecting mechanisms used in conjunction with marine propulsion systems typically utilize a shift shaft that causes a clutch actuator to move between the forward, neutral, and reverse gear positions.

U.S. Pat. No. 4,223,773, which issued to Croisant et al. on Sep. 23, 1980, discloses a drive engaging apparatus. A clutch apparatus for a marine drive lower gear case includes a propeller shaft rotatably mounted in a gear case housing. A drive gear for both forward and reverse is positioned in the housing coaxial with the propeller shaft and a clutch member is rotatably fixed on the propeller shaft and movable axially into drive engagement with the drive gear. Clutch engaging elements are provided on opposite portions of the drive gears and the clutch member. Shift means utilizing a positive acting cam means positively move the clutch member into and out of engagement from the drive gears. The shift means also include a releasable latch means to positively maintain the shift means in the engaged position and a preloading means between the shift means and the clutch member to snap the clutch member into engagement.

U.S. Pat. No. 4,986,774, which issued to Wantz on Jan. 22, 1991, discloses a desmodromic shift adaptor for a counter-rotating propeller shaft assembly. An adaptor member for accommodating use of a desmodromic cam-actuated shifting mechanism into a convention propeller shaft cavity formed in the lower end of the gearcase of a marine propulsion system is disclosed. In a system of this type, forward thrust on the propeller shaft is transferred to the gearcase at a point aft of the forward and reverse gears mounted about the propeller shaft. The adaptor member includes a cup, which is adapted to mount the fore one of the forward and reverse gears through a bearing member. The adaptor member further includes an internal passage within which is disposed the movable cam of the shifting mechanism and an opening is in communication with the passage for allowing connection of the shift shaft to the shifting cam after assembly of the adaptor member into the gearcase cavity.

U.S. patent application Ser. No. 10/090,202 (M09567) which was filed by Sawyer et al. on Jan. 3, 2003, discloses a shift mechanism for a marine propulsion system. A gearshift mechanism is provided in which a cam structure comprises a protrusion that is shaped to extend into a channel formed in a cam follower structure. The cam follower structure can be provided with first and second channels that allow the protrusion of the cam to be extended into either channel which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. patent application Ser. No. 10/211,186 (M09615) which was filed by Sawyer on Aug. 2, 2002, discloses a gear selector actuation system for a marine propulsion device. An actuation system for a gear selector of a marine propulsion device incorporates an adjustable motion directing component that changes the path of travel of an actuator end of a push-pull cable. This adjustable change creates a beneficial effect by changing the relative positions of a shift shaft and associated link arms in relation to positions of a wire within a sheath of a push-pull cable.

In a typical application of a marine propulsion system, a throttle and shift handle is provided near the helm of a boat for the operator of the marine vessel in order to allow the operator to move the handle to change the gear selector between neutral, forward, and reverse gear positions. The manually controllable throttle and shift handle is typically connected to the clutch mechanism of the marine propulsion system by a push-pull cable. A push-pull cable typically comprises a metal wire within an outer tubular sheath. The sheath is generally attached to various locations of the marine vessel and the wire is able to slide axially within the outer sheath to transfer force from the manually controllable throttle and shift lever to the clutch mechanism of the marine propulsion device.

One inherent problem with push-pull cables is that the axial movement of the wire at one end of the cable (e.g. at the manually controllable throttle and shift lever) is not necessarily identical to the magnitude of movement of the wire at the opposite end of the push-pull cable (e.g. at the marine propulsion device). This can be caused by bending of the wire within the surrounding sheath because of necessary radial clearances between these two components. As a result, when moving the manually controllable throttle and shift lever in one direction, the wire at the handle may actually move more than the resulting movement of the wire at the clutch mechanism, at the opposite end of the push-pull cable. In the opposite direction, this same problem may or may not exist. This condition, which is inherent in push-pull cables, is exacerbated by increased length of the push-pull cable.

It would be significantly beneficial if a clutch actuation system could be provided which accommodates the varying differences in movement between the throttle and shift handle, which is manually controlled by the operator of the marine vessel, and the actual clutch actuation mechanism of the marine propulsion system.

The patents described above are hereby expressly incorporated by reference in the description of the present invention.

SUMMARY OF THE INVENTION

A clutch mechanism for a marine propulsion system, made in accordance with the preferred embodiment of the present invention, comprises a cam member supported for rotation about a first axis. The cam member has a first cam surface. A cam follower is supported for axial movement parallel to a second axis. The cam follower has a first cam follower surface. The first cam surface and the first cam follower surface are shaped to cause axial movement of the cam follower in response to rotational movement of the cam member between a first rotational position and second rotational position. The first cam surface and the first cam follower surface are also shaped to allow the cam member to rotate between the second rotational position and a third rotational position without causing the cam follower to move parallel to the second axis.

The first cam follower surface is formed as a surface of a cavity formed in the cam follower and comprises a first cam follower surface segment and a second cam follower surface segment. The first cam follower surface segment is shaped to cause the cam follower to move parallel to the second axis in response to rotational movement of the cam member between the first and second rotational positions. The second cam follower surface segment is shaped to allow the cam member to rotate between the second and third rotational positions without causing the cam follower to move parallel to the second axis.

The first cam surface and the first cam follower surface are shaped to remain in continual contact with each other during rotation of the cam member between the first and second rotational positions and between the second and third rotational positions.

The present invention further comprises a shift shaft connected in torque transmitting relation with the cam member. The shift shaft is supported for rotation about the first axis. A control member is rotatably attached to the cam follower for axial movement in coordination with the cam follower parallel to the second axis. A clutch member is attached to the second member for coordinated rotation and axial movement parallel to the second axis with the control member.

The cam member and the cam follower are shaped in a symmetrical manner so that the action of the fist cam surface and the first cam follower surface are replicated, in opposite directions, by a second cam surface and a second cam follower surface because of the symmetry of the components. The second cam follower surface comprises third and fourth cam follower surface segments which operate in a manner similar to the first and second cam follower surface segments, but in opposite directions because of the symmetry of the components.

In a preferred embodiment of the present invention, the first and second axes are generally perpendicular to each other.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
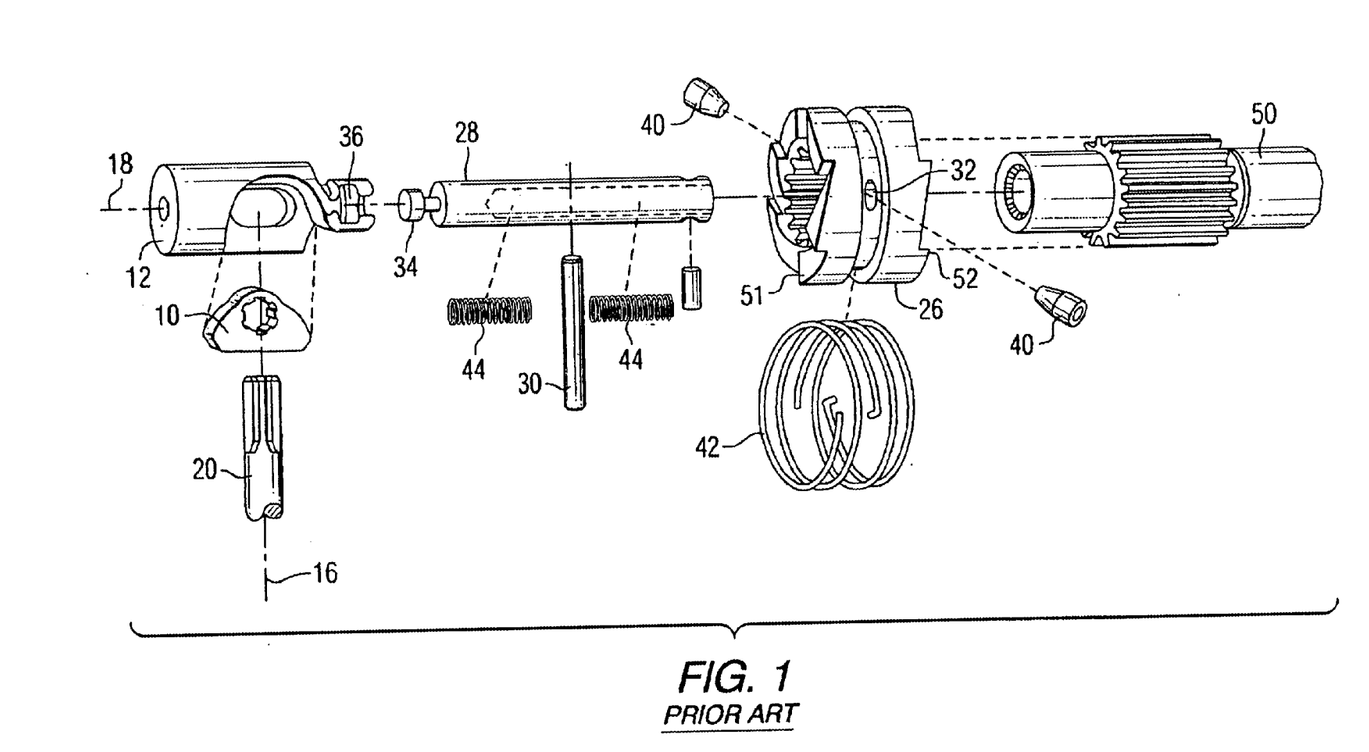
FIGS. 1 and 2 are isometric exploded illustrations of clutch actuators known to those skilled in the art.
Figure 2:
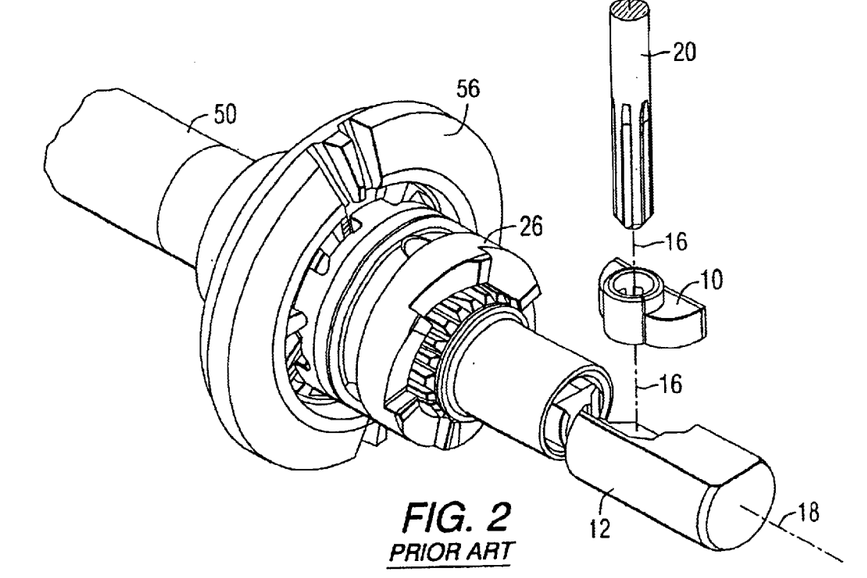

FIGS. 1 and 2 are exploded isometric views of shift actuators that are generally known to those skilled in the art. FIG. 1 is similar to the illustration identified as FIG. 3 in U.S. Pat. No. 4,223,773. FIG. 2 is similar to the illustration identified as FIG. 4 in U.S. patent application Ser. No. 10/090,202.

With reference to FIGS. 1 and 2, a cam member 10 and a cam follower 12 are configured in such a way that rotation of the cam member 10 about a first axis 16 causes the cam follower 12 to move axially in a direction parallel to a second axis 18. A shift shaft 20 is connected in torque transmitting relation with a cam member 10 to cause the cam member 10 to rotate with the shift shaft 20 about the first axis 16. A clutch member 26 can be moved axially because of its connection to a control member 28 which is attached to the clutch member 26 by a pin 30 that extends through the control member 28 and through hole 32. As a result, the clutch member 26 moves axially in a direction parallel to the second axis 18 in coordination with the control member 28. The control member 28 has an end portion 34 that is shaped to be received in a slot 36 of the cam follower 12. The control member 28 rotates with the clutch member 26 relative to the cam follower 12 which does not rotate about the second axis 18. Axial movement of the cam follower 12, caused by rotation of the cam member 110 causes the cam follower 12, the control member 28, and the clutch member 26 to move axially in a direction parallel to the second axis 18. Pins 40, spring 42, and springs 44 are described in detail in U.S. Pat. No. 4,223,773. A driven shaft 50 is connected to a propeller shaft (not shown in FIGS. 1 and 2). Two sets of teeth, 51 and 52, are shaped to engage corresponding teeth in forward and reverse gears. Reference numeral 56 in FIG. 2 is used to identify one exemplary gear that is illustrated to show its relative position in the assembly of components shown in FIG. 2.

With continued reference to FIGS. 1 and 2, which show prior art clutch actuator mechanisms, rotation of the shift shaft 20 causes the cam member 10 to rotate about the first axis 16. Interaction between the cam surfaces and cam follower surfaces, which will be described in greater detail below, cause the cam follower 12 to move in a direction parallel to the second axis 18. The connection of the cam follower 12 to the control member 28 causes the control member to move axially in a direction parallel to the second axis 18 with the cam follower 12. The connection of the clutch member 26 to the control member 28 causes the clutch member to move in a similar path in coordination with the control member 28.

Figure 3:
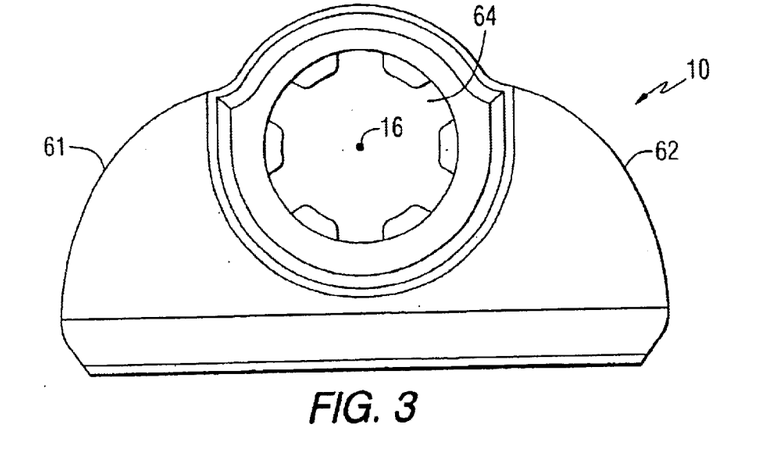
FIG. 3 shows a cam member that is usable in conjunction with the present invention.

FIG. 3 shows the cam member 10. The cam member is intended to rotate about the first axis 16. The cam member 10 has a first cam surface 61 and a second cam surface 62. The opening 64 formed through the cam member 10 is shaped to received the splined end of the shift shaft 20, which is described above in conjunction with FIGS. 1 and 2.

Figure 4:
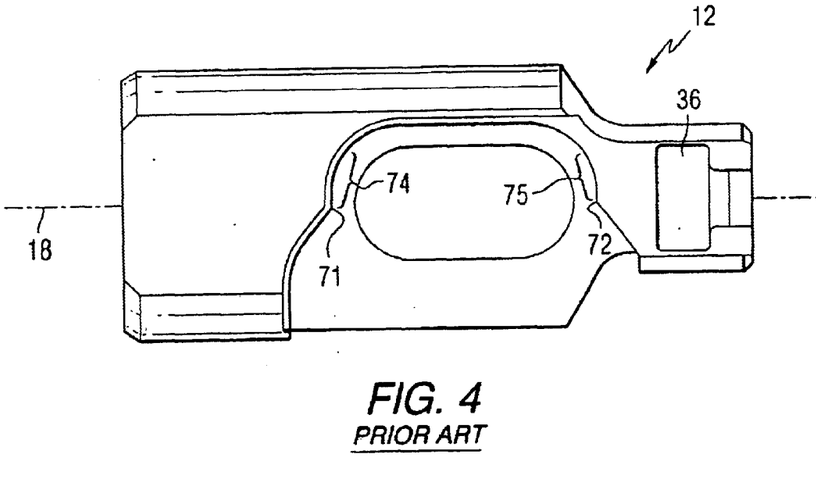
FIG. 4 shows a cam follower known to those skilled in the art.

FIG. 4 shows a cam follower 12 that is well known to those skilled in the art. It has a first cam surface 71 and a second cam surface 72. The first and second cam surfaces, 71 and 72, represent the points of contact between the first and second cam follower surfaces and the cam surfaces, 61 and 62, respectively. For reference to the discussion below pertaining to the cam follower 12 of the present invention, two regions of the cam follower surfaces are identified in FIG. 4 by reference numerals 74 and 75.

Figure 5:
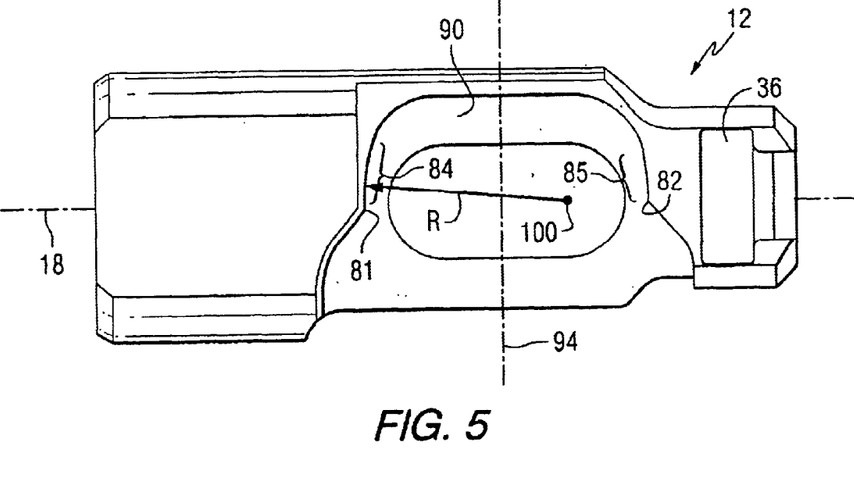
FIG. 5 shows a cam follower made in accordance with the preferred embodiment of the present invention.

FIG. 5 shows a cam follower 12 made in accordance with the preferred embodiment of the present invention. Reference numeral 81 identifies a first cam follower surface segment and reference numeral 84 identifies a second cam follower surface segment which, combined together, define the first cam follower surface of the cam follower 12. On the opposite side of the cavity 90, reference numeral 82 identifies a third cam follower surface segment and reference number 85 identified a fourth cam follower surface segment. Together, the first and second cam follower surface segments, 82 and 85, define the second cam follower surface of the present invention. The primary distinction between the present invention and cam followers known to those skilled in the art is the arrangement and shape of the first and second cam follower surface segments, 81 and 84, and the third and fourth cam follower surface segments, 82 and 85. Since the cam follower surface of the present invention is symmetrical about line 94, the specific shape of only the first cam follower surface will be described in detail below.

Figure 6:
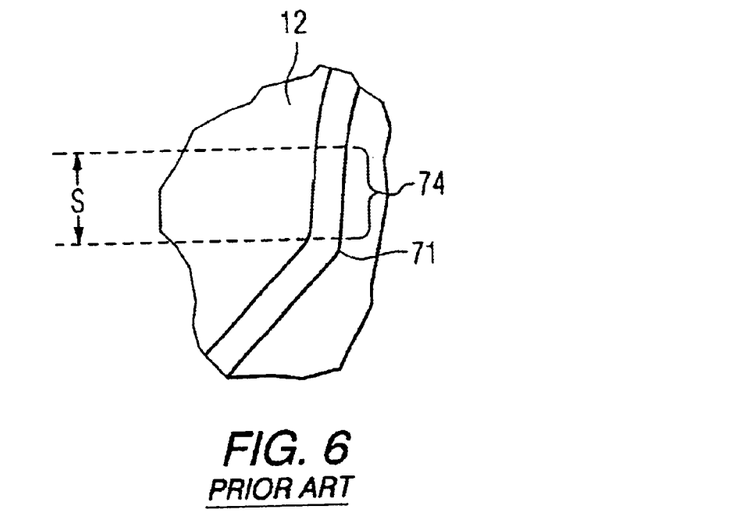
FIG. 6 is a partial view of the illustration in FIG. 4.

FIG. 6 is an enlarged view of the first cam follower surface segment 71 and the region of the cam follower surface, in the prior art cam follower 12 of FIG. 4, which is identified by reference numeral 74. The region of the first cam follower surface in FIG. 6 identified as "S" is a planer region of the surface. In other words, between the two dashed lines in FIG. 6, the edge of the region 74 is a straight line. When the first cam member surface 61 moves past the first cam follower surface 71, as the cam member 10 rotates in a clockwise direction, the shape of the region 74 prevents further rotation by the cam member 10.

Figure 7:
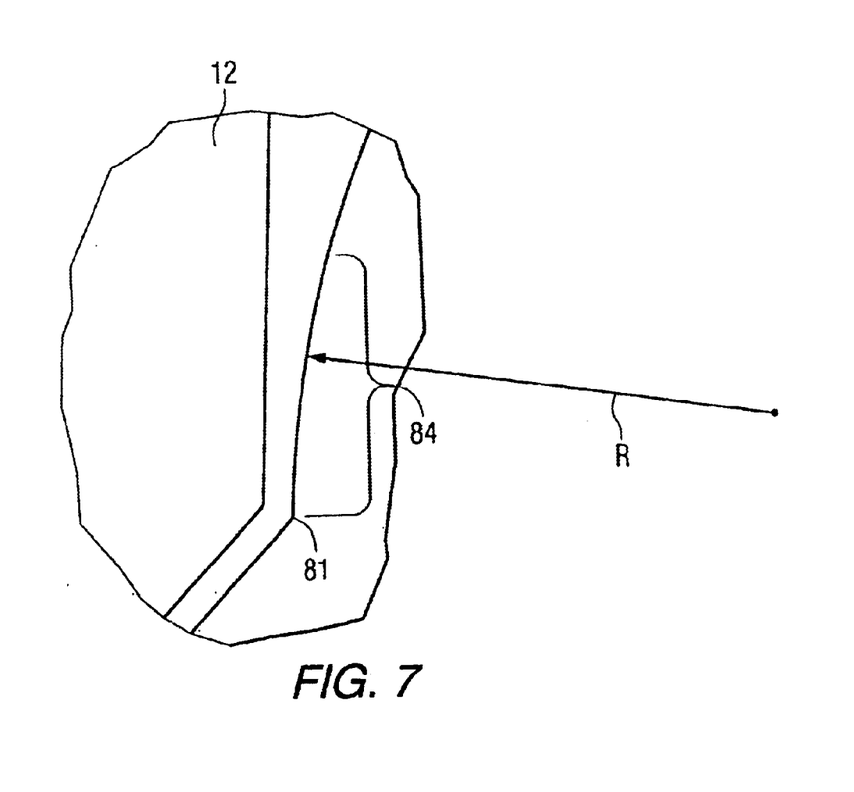
FIG. 7 is a partial view of the illustration in FIG. 5.

FIG. 7 shows the first and second cam follower surface segments, 81 and 84, of the present invention shown in FIG. 5. The location and shape of the first cam follower surface segment 81 is generally similar to that of the first cam follower surface segment 71 in the prior art. Its purpose is to remain in contact with the first cam member surface 61 shown in FIG. 3 and, as the cam member 10 rotates in a clockwise direction, exert a force against the first cam follower surface segment, 71 or 81, to cause the cam follower 12 to move toward the left in FIGS. 4 and 5 and parallel to the second axis 18. This axial movement of the cam follower 12 continues until the first cam member surface 61 moves out of contact with the first cam follower surface segment, 71 or 81. In the prior art device illustrated in FIGS. 4 and 6, the rotation of the cam member 10 must stop when the first cam member surface 61 moves out of contact with the first cam follower surface segment 71. However, in a cam follower 12 made in accordance with the present invention, the cam member 10 is permitted to continue to rotate in a clockwise direction about the first axis 16 without causing the cam follower 12 to move axially in a direction parallel to the second axis 18. The second cam follower surface segment 84 is shaped as an arc of a circle having a radius R as represented by the arrow in FIG. 7. After the first cam member surface 61 moves past the first cam follower surface segment 81, it remains in contact with, and slides along, the surface identified by reference numeral 84 in FIG. 7 without causing the cam follower 12 to move further in an axial direction parallel to the second axis 18. This, in essence, creates a dwell position, or lost motion, between the rotation of the cam member 10 and the axial movement of the cam follower 12.

With reference to FIGS. 5 and 7, the arcuate shape of the region identified by reference numeral 84 is configured with a radius R that extends from a point 100 that is shown in FIG. 5. Point 100 is defined as the location of the first axis 16 when the first cam member surface 61 moves out of contact with the first cam follower surface segment 81. Therefore, from point 81 through the region identified by reference numeral 84, the second cam follower surface segment 84 is arcuate in shape and defined by radius R measured from point 100. It should be understood that the shape of the fourth cam follower surface segment 85 is similarly configured, but in an opposite direction from a point where the first axis 16 is located when the second cam member surface 62 moves out of contact with the third cam follower surface segment 82.

Figure 8:
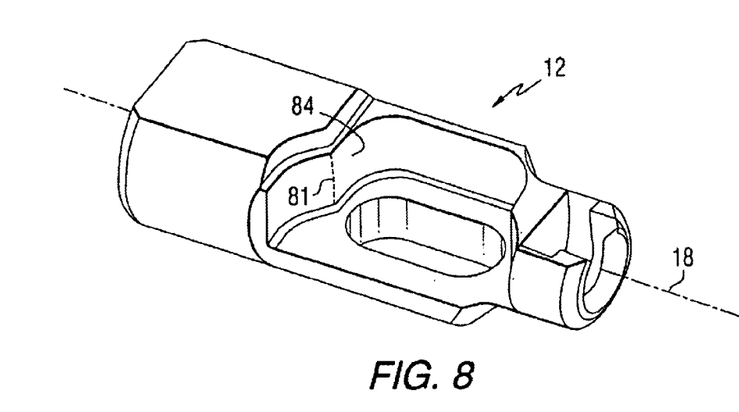
FIG. 8 is an isometric representation of a cam follower made in accordance with the preferred embodiment of the present invention.

FIG. 8 is an isometric view of the cam follower 12 made in accordance with the present invention. In FIG. 8, the second axis 18 is illustrated along with a dashed line to identify the first cam follower surface segment 81. Reference numeral 84 indicates the location of the arcuate surface defined by radius R (not shown in FIG. 8).

FIGS. 9A–9D represent sequential positions of the cam member 10 and cam follower 12 as the cam member 10 rotates about the first axis 16. Line 110 represents the axial position of the first axis 16 in comparison to the second axis 18. It should be understood that the first axis 16 does not move during the rotation of the cam member 10. Instead, it is the fixed central axis of rotation of both the shift shaft and the cam member 10. Line 114 is provided for comparison purposes and will be described in greater detail below. Line 114 represents the maximum extent of travel of the cam follower 12 in the direction toward the right in FIGS. 9A–9D.

Figure 9A:
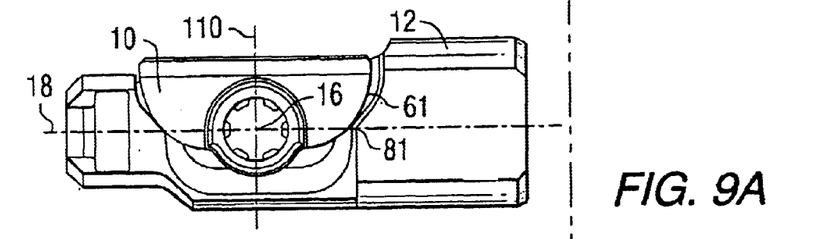
FIGS. 9A–9D are sequential illustrations of a cam follower and cam member made in accordance with the preferred embodiment of the present invention.

In FIG. 9A, the cam member 10 is at its central position which represents a neutral gear position. From the position of the cam follower 12 in FIG. 9A, it can move either toward the left or the right, depending on the direction of rotation of the cam member 10. For purposes of this discussion in conjunction with FIGS. 9A–9D, the cam follower will be described in terms of its movement toward the is right in a direction parallel to the second axis 18 in response to rotation of the cam member 10 in a clockwise direction about the first axis 16.

Figure 9B:
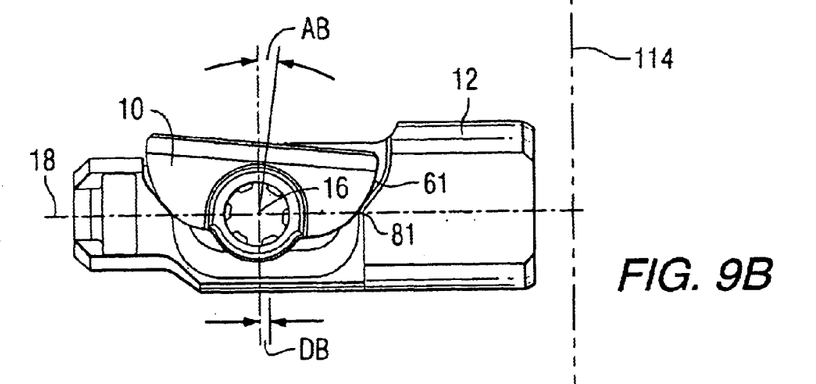

FIG. 9B shows the relationship of the components after the cam member 10 has rotated by an amount represented as AB degrees in a clockwise direction. The contact between the first cam member surface 61 and the first cam follower surface segment 81 causes the cam follower 12 to move toward the right in FIG. 9B by a distance identified as DB. In one embodiment of the present invention, angle AB is equal to 6 degrees and distance DB is equal to approximately 0.0445 inches.

Figure 9C:
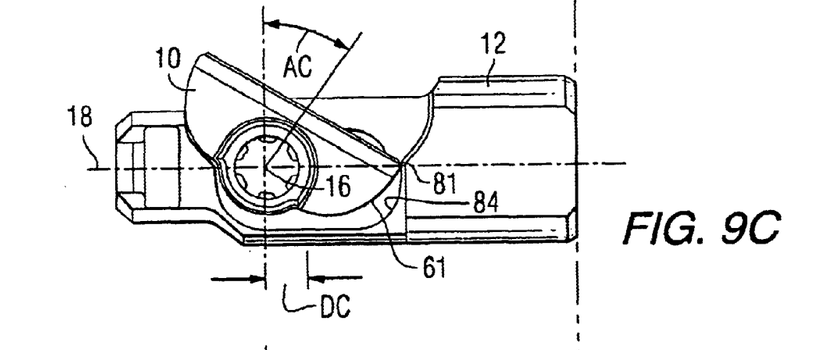

In FIG. 9C, the cam member 10 has further rotated so that its first cam surface 61 is about to move away from the first cam follower surface segment 81. The cam member 10 has rotated by an amount represented as AC in FIG. 9C and this rotation of the cam member results in an axial movement of the cam follower 12 by a distance identified as DC. In a preferred embodiment of the present invention, angle AC is equal to approximately 33.29 degrees and distance BC is equivalent to approximately 0.2320 inches.

Figure 9D:
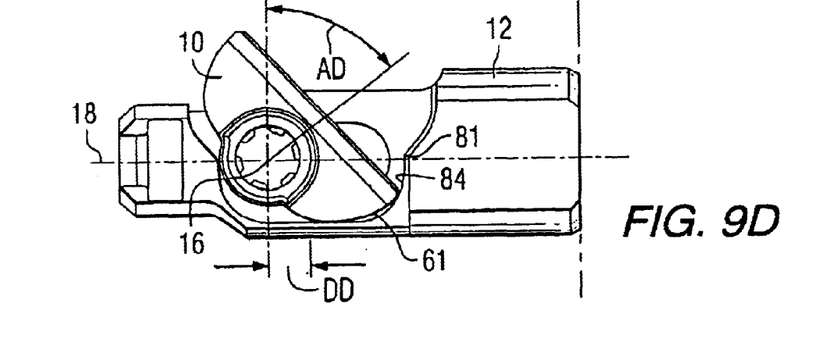

In FIG. 9D, the cam member 10 has further rotated beyond the point of contact between the first cam surface 61 and the first cam follower surface segment 81. The trailing edge of the first cam surface 61 continues to move in contact with the second cam follower surface segment 84, but this movement does not cause further axial movement of the cam follower 12 in a direction parallel to the second axis 18. In other words, dimensions DC and DD are equal to each other even though angular dimension AD is greater than angular dimension AC. In a preferred embodiment of the present invention, dimension AD is generally equal to approximately 50.0 degrees and dimension DD is generally equal to 0.2320 inches.

Comparing FIGS. 9C and 9D, rotation of AC degrees is sufficient to move the cam follower 12 to its maximum position toward the right and parallel to the second axis 18, as represented by line 114. Further movement of the cam member 10 to rotation dimension AD degrees causes no further movement of the cam follower 12 beyond line 114. As a result, the present invention allows sufficient overtravel of the cam member 10 within the cavity of the cam follower 12 to accommodate variations in movement between the required cam follower movement and the movement of a manually controlled throttle and shift lever that is connected to the clutch actuation system by a push-pull cable. As described above, push-pull cables often exhibit an inherent variation between the movement of one end of the wire of the push-pull cable and the other end of the wire of the cable. As a result, moving a throttle and shift lever to its maximum distance in one direction (e.g. the forward direction) may result in the cam member 10 rotating by a different magnitude than it would rotate in response to movement of the manually controlled throttle and shift lever in the opposite direction (e.g. reverse). By allowing the overtravel of the cam member 10, as illustrated in FIGS. 9C and 9D, this variation in operation of the push-pull cable can be accommodated. As a result, the cam member may rotate to AD degrees in the clockwise direction, but may rotate by a different magnitude of degrees in the counterclockwise direction. The allowance of the overtravel accommodates this variation while assuring that sufficient axial movement of the cam follower 12 is provided in a direction parallel to the second axis 18.

Figure 10:
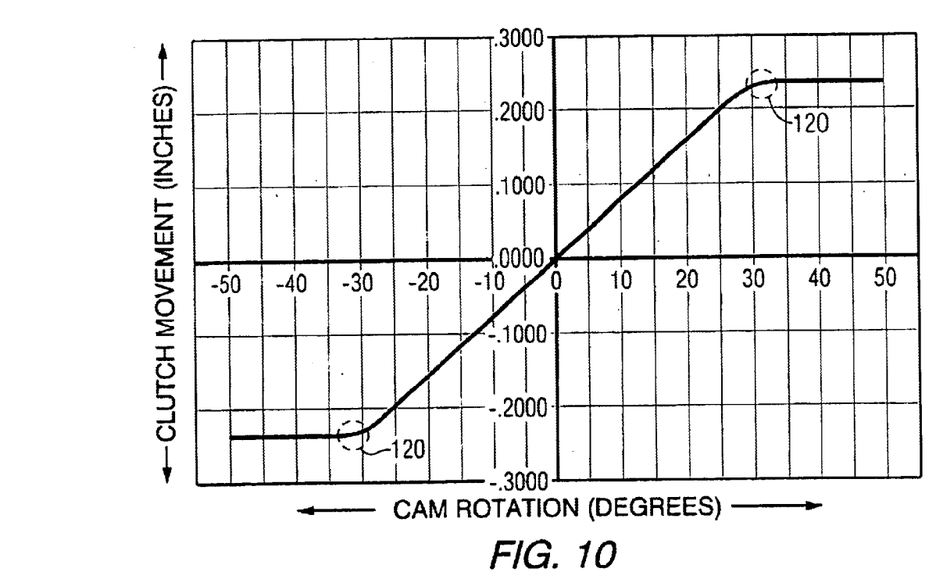
FIG. 10 is a graphical representation showing the relationship between the magnitude of rotation of the cam member and the magnitude of movement of the cam follower according to a preferred embodiment of the present invention.

FIG. 10 is a graphical representation showing the relationship between the angular rotation of the cam member 10 and the linear movement of the cam follower 12 in a direction parallel to the second axis 18. It can be seen that the rotation of the cam follower 12 between approximately plus and minus 33.29 degrees is generally linear in comparison to the resulting movement of the cam follower 12. At the locations represented by dashed circles 120, which represent the condition illustrated in FIG. 9C, the axial movement of the cam follower 12 ceases while rotational movement of the cam member 10 continues. The continued rotation, between angular position AC and angular position AD, allows the variation in the behavior of the push-pull cable to be accommodated.

With reference to FIGS. 1–10, it can be seen that the present invention provides a clutch mechanism for a marine propulsion system that comprises a cam member 10 supported for rotation about a first axis 16 in which the cam member 10 has a first cam surface 61. A cam follower 12 is supported for axial movement parallel to a second axis 18. The cam follower 12 has a first cam follower surface, 81 and 84, and the first cam surface 61 in combination with first cam follower surface 81 and 84, are shaped to cause axial movement of the cam follower 12 in response to rotational movement of the cam member 10 between a first rotational position shown in FIG. 9A and a second rotational position shown in FIG. 9C. The first cam surface 61 and the first cam follower surface, 81 and 84, are shaped to allow the cam member 10 to rotate between the second rotational position in FIG. 9C to a third rotational positional in FIG. 9D without causing the cam follower 12 to move parallel to the second axis 18.

The first cam follower surface 12 is formed as a surface of a cavity 90 formed in the cam follower 12. The first cam follower surface, 81 and 84, comprises a first cam follower surface segment 81 and a second cam follower surface segment 84. The first cam follower surface segment 81 is shaped to cause the cam follower 12 to move parallel to the second axis 18 in response to rotational movement of the cam member 10 between the first and second rotational positions represented in FIGS. 9A and 9C, respectively. The second cam follower surface segment 84 is shaped to allow the cam member to rotate between the second and third rotational positions as shown in FIGS. 9C and 9D respectively without causing the cam follower 12 to move parallel to the second axis 18.

The first cam surface 61 and the first cam follower surface, 81 and 84, are is shaped to remain in continual contact with each other during rotation of the cam member between the first and second rotational positions shown in FIGS. 9B and 9C, respectively. The first cam surface 61 and the first cam follower surface, 81 and 84, are shaped to remain in continual contact with each other during rotation of the cam member 10 between the second and third rotational positions, illustrated in FIGS. 9C and 9D, respectively.

The present invention further comprises a shift shaft 20 connected in torque transmitting relation with the cam member 10, wherein the shift shaft 20 is supported for rotation about the first axis 16. A control member 28 is rotatably attached to the cam follower 12 for axial movement in coordination with the cam follower 12 parallel to the second axis 18. A clutch member 26 is attached to the control member 28 for coordinated rotation and axial movement parallel to the second axis with the control member 28.

Because of the symmetrical nature of the preferred embodiment of the present invention, the first and second cam surfaces, 61 and 62, are generally similar to each other in shape and operation. In addition, the first and third cam follower surface segments and the second and fourth cam follower surface segments are similar to each other because of this symmetry. The operation of the present invention is similar and symmetrical in both the clockwise and counterclockwise rotational directions of the cam member 10.

Although the present invention has been described in considerable detail and illustrated with specificity to show a preferred embodiment, it should be understood that alternative embodiments are also within its scope.

We claim:

1. A clutch mechanism for a marine propulsion system, comprising:
   a cam member supported for rotation about a first axis, said cam member having a first cam surface; and
   a cam follower supported for axial movement parallel to a second axis, said cam follower having a first cam follower surface, said first cam surface and said first cam follower surface being shaped to cause axial movement of said cam follower in response to rotational movement of said cam member between a first rotational position and a second rotational position, said first cam surface and said first cam follower surface being shaped to allow said cam member to rotate between said second rotational position and a third rotational position without causing said cam follower to move parallel to said second axis, said third rotational position being located at a first end of travel in a first rotational direction of said cam member, said first and second axes being generally perpendicular to each other.

2. The clutch mechanism of claim 1, wherein:

said first cam follower surface is formed as a surface of a cavity formed in said cam follower.

3. The clutch mechanism of claim 1, wherein:

said first cam follower surface comprises a first cam follower surface segment and a second cam follower surface segment.

4. The clutch mechanism of claim 3, wherein:

said first cam follower surface segment is shaped to cause said cam follower to move parallel to said second axis in response to rotational movement of said cam member between said first and second rotational positions.

5. The clutch mechanism of claim 3, wherein:

said second cam follower surface segment is shaped to allow said cam member to rotate between said second and third rotational positions without causing said cam follower to move parallel to said second axis.

6. The clutch mechanism of claim 1, wherein:

said first cam surface and said first cam follower surface are shaped to remain in continual contact with each other during rotation of said cam member between said first and second rotational positions.

7. The clutch mechanism of claim 1, wherein:

said first cam surface and said first cam follower surface are shaped to remain in continual contact with each other during rotation of said cam member between said second and third rotational positions.

8. The clutch mechanism of claim 1, further comprising:

a shift shaft connected in torque transmitting relation with said cam member.

9. The clutch mechanism of claim 8, wherein:

said shift shaft is supported for rotation about said first axis.

10. The clutch mechanism of claim 1, further comprising:

a control member rotatably attached to said cam follower for axial movement in coordination with said cam follower parallel to said second axis.

11. The clutch mechanism of claim 10, further comprising:

a clutch member attached to said control member for coordinated rotation and axial movement parallel to said second axis with said control member.

12. The clutch mechanism of claim 1, wherein:

said cam member has a second cam surface;

said cam follower has a second cam follower surface, said second cam surface and said second cam follower surface being shaped to cause axial movement of said cam follower in response to rotational movement of said cam member between said first rotational position and a fourth rotational position, said second cam surface and said second cam follower surface being shaped to allow said cam member to rotate between said fourth rotational position and a fifth rotational position without causing said cam follower to move parallel to said second axis said fifth rotational position being located at a second end of travel in a second rotational direction of said cam member.

13. The clutch mechanism of claim 12, wherein:

said second cam follower surface is formed as a surface of said cavity formed in said cam follower;

said second cam follower surface comprises a third cam follower surface segment and a fourth cam follower surface segment;

said third cam follower surface segment is shaped to cause said cam follower to move parallel to said second axis in response to rotational movement of said cam member between said first and fourth rotational positions;

said fourth cam follower surface segment is shaped to allow said cam member to rotate between said fourth and fifth rotational positions without causing said cam follower to move parallel to said second axis.

14. The clutch mechanism of claim 13, wherein:

said second cam surface and said second cam follower surface are shaped to remain in continual contact with each other during rotation of said cam member between said first and fourth rotational positions; and said second cam surface and said second cam follower surface are shaped to remain in continual contact with each other during rotation of said cam member between said fourth and fifth rotational positions.

* * * * *